Dec. 15, 1942.  W. L. ZINK ET AL  2,304,869
TRACTOR CULTIVATOR
Filed July 10, 1939    5 Sheets-Sheet 1

William L. Zink
Byron T. Aasland
INVENTORS

BY  Eric B. Prime
ATTORNEY.

Dec. 15, 1942.  W. L. ZINK ET AL  2,304,869
TRACTOR CULTIVATOR
Filed July 10, 1939  5 Sheets-Sheet 3

William L. Zink
Byron T. Aasland
INVENTORS

BY Eric B. Prime
ATTORNEY.

Dec. 15, 1942.  W. L. ZINK ET AL  2,304,869
TRACTOR CULTIVATOR
Filed July 10, 1939   5 Sheets-Sheet 4

William L. Zink
Byron T. Aasland
INVENTORS

BY Eric B. Prime
ATTORNEY.

Dec. 15, 1942.  W. L. ZINK ET AL  2,304,869
TRACTOR CULTIVATOR
Filed July 10, 1939   5 Sheets-Sheet 5

William L. Zink
Byron T. Aasland
INVENTORS

BY Eric D. Prime
ATTORNEY.

Patented Dec. 15, 1942

2,304,869

UNITED STATES PATENT OFFICE 2,304,869

TRACTOR CULTIVATOR

William L. Zink, Plano, and Byron T. Aasland, Kankakee, Ill., assignors to Sears, Roebuck and Co., Chicago, Ill., a corporation of New York Application July 10, 1939, Serial No. 283,518

9 Claims. (Cl. 97—47)

This invention relates generally to agricultural implements and more particularly to tractor-cultivators wherein the cultivator structure is adapted for being attached to the tractor and for having ground working tools such as discs, sweeps, shovels, and the like, connected therewith for working the ground.

One of the primary objects of the present invention is to provide a tractor cultivator having improved and novel attachment structures and means for connecting the attachment structures with the front and rear of the tractor, which are simple in construction and adapted for withstanding the maximum strains and stresses which may be imposed on the structures resulting from the cultivating operations, and which may be quickly and easily attached to or detached from the tractor.

Another important object of this invention is to provide a tractor cultivator having improved and novel means for operatively connecting cultivator rigs positioned on opposite sides of the tractor at the front thereof with cultivator rigs attached to the rear of the tractor whereby all of the rigs may be actuated simultaneously for being moved toward or away from the ground and whereby the sets of cultivating rigs positioned on opposite sides of the tractor and at the rear of the tractor may be adjustably positioned relatively to each other by the operator while sitting in the driver's seat on the tractor.

A further object of this invention is to provide a tractor cultivator having improved and novel means whereby all of the cultivating rigs may be quickly and easily lifted or lowered manually relatively to the ground and locked in their uppermost and lowermost positions by the operator while sitting in the driver's seat of the tractor.

Another object of this invention is to provide a cultivator attachment structure for tractors having novel means whereby the spacing of the cultivator rigs may be readily varied for adapting the ground working tools carried thereby to the spacing of the rows to be cultivated.

A further important object of this invention also is the provision of a cultivator-attachment structure for tractors wherein the cultivator rigs may be lifted and lowered either manually or by power means.

Other objects and advantages will be apparent from the following specification.

Figure 1:
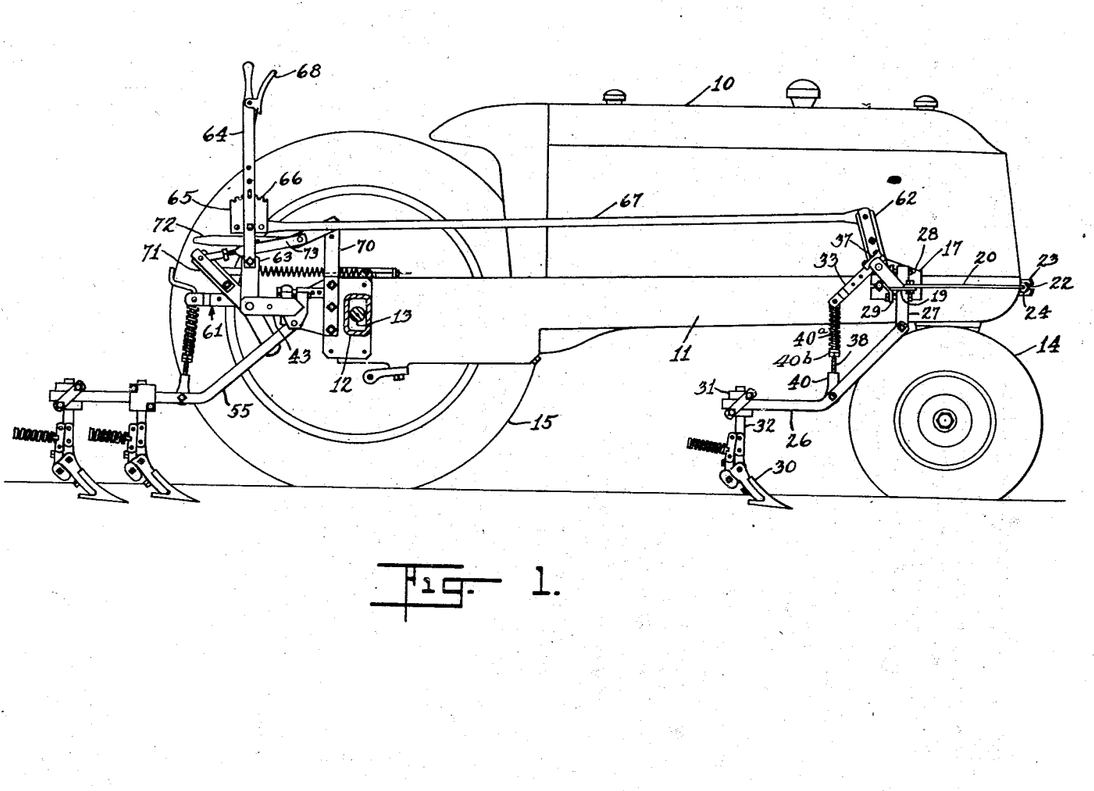
Figure 1 is a side elevation of a tractor showing the cultivator-attachment structure connected therewith, the rear axle and axle housing being shown in section.
Figure 2:
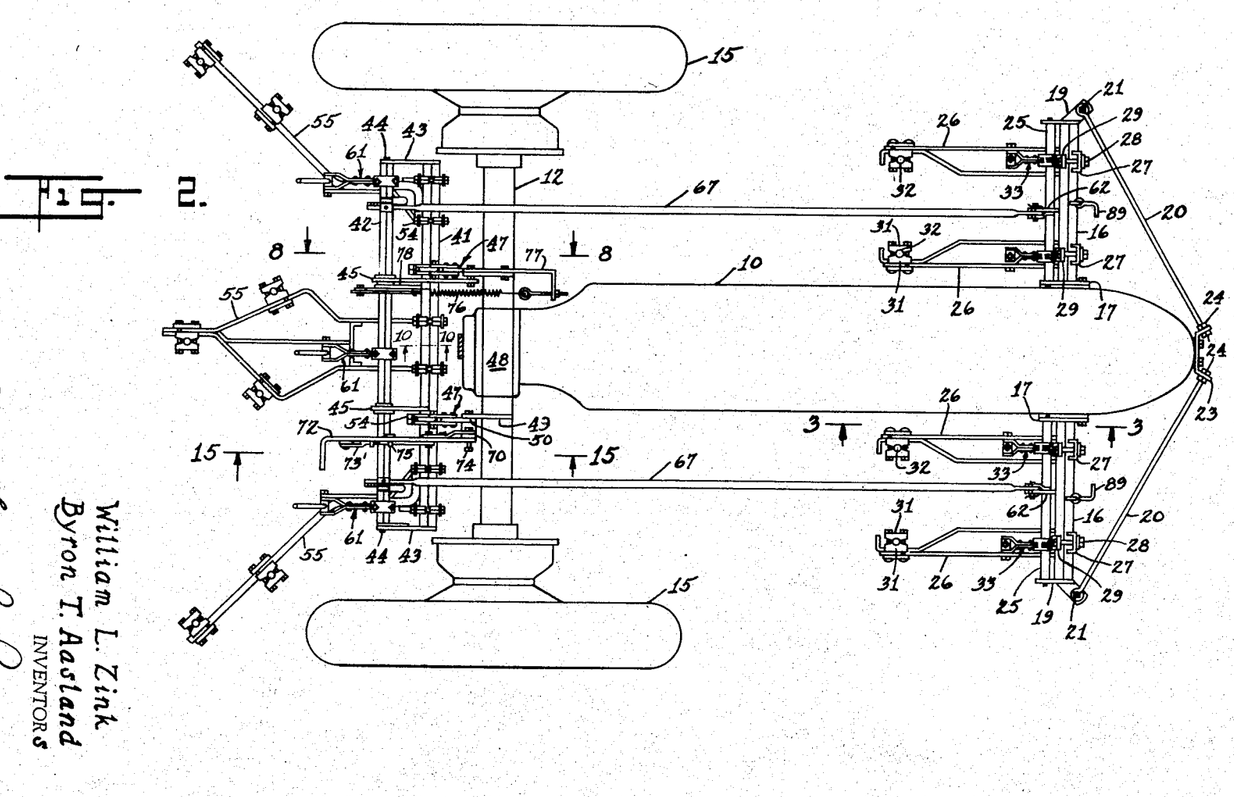
Figure 2 is a top plan view of the structure shown in Figure 1.

In the drawings illustrating a preferred embodiment of the invention, a tractor 10 is provided as shown in Figures 1 and 2, comprising a frame 11 and a rear axle housing 12 in which is disposed the power driven axle 13. The front of the tractor is mounted on the front wheels 14 and the rear axle is mounted on rear wheels 15 by means of which the tractor is driven.

Figure 3:
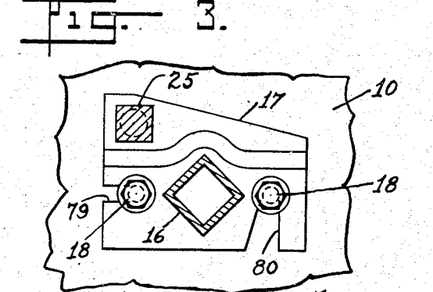
Figure 3 is a vertical section taken along the line 3—3 of Figure 2.

As shown in the drawings, a pair of tubular supporting bars 16, substantially square in cross-section, is disposed on opposite sides of the tractor and extends outwardly from the frame 11 of the tractor in substantially horizontal positions. Each of the supporting bars 16 has the inner end thereof welded to a plate 17, which, in turn, is connected to the frame 11 of the tractor by means of bolts 18, as best shown in Figure 3.

An arm 19 is fixedly connected by welding to the outer end of each of the supporting bars 16, and is secured to the front of the tractor by means of a rod 20 which has one end secured to the arm 19 by means of a bolt 21 and the other end disposed in a slotted opening 22 in a bracket 23 connected to the front of the tractor, the rod 20 being secured to the bracket 23 by means of nuts 24 disposed on the rod 20.

A rocker shaft 25, substantially square in cross-section, is positioned parallel and in spaced relationship with each of the supporting bars 16 and has the ends thereof rotatably mounted in the arm 19 and the plate 17. Since the structure associated with the supporting bar 16 and the rocker shaft 25 on each side of the tractor is the same, it is believed that a description of that structure associated with one side of the tractor will be sufficient.

A pair of implement supporting beams 26 is positioned below the supporting bar 16 and has one end thereof pivotally connected with dependent channel shaped members 27 which in turn are fixedly connected to the supporting bar 16. The channel shaped members 27 are provided with V-shaped recesses for receiving the supporting bar 16 and are held in fixed positions by means of bolts 28 positioned above and below the supporting bar 16 and extending through openings in the channel shaped member and a plate 29 positioned on the opposite side of the supporting bar 16, the plate 29 being V-shaped in formation for receiving the supporting bar. The ground working tools or implements 30 are connected with the outer ends of the swingable implement supporting beams 26 in any suitable manner such as by means of gripping elements 31 which are bolted to the implement supporting arms and receive a shank 32 therebetween which comprises a part of the ground working tool.

Figures 5, 6, 7:
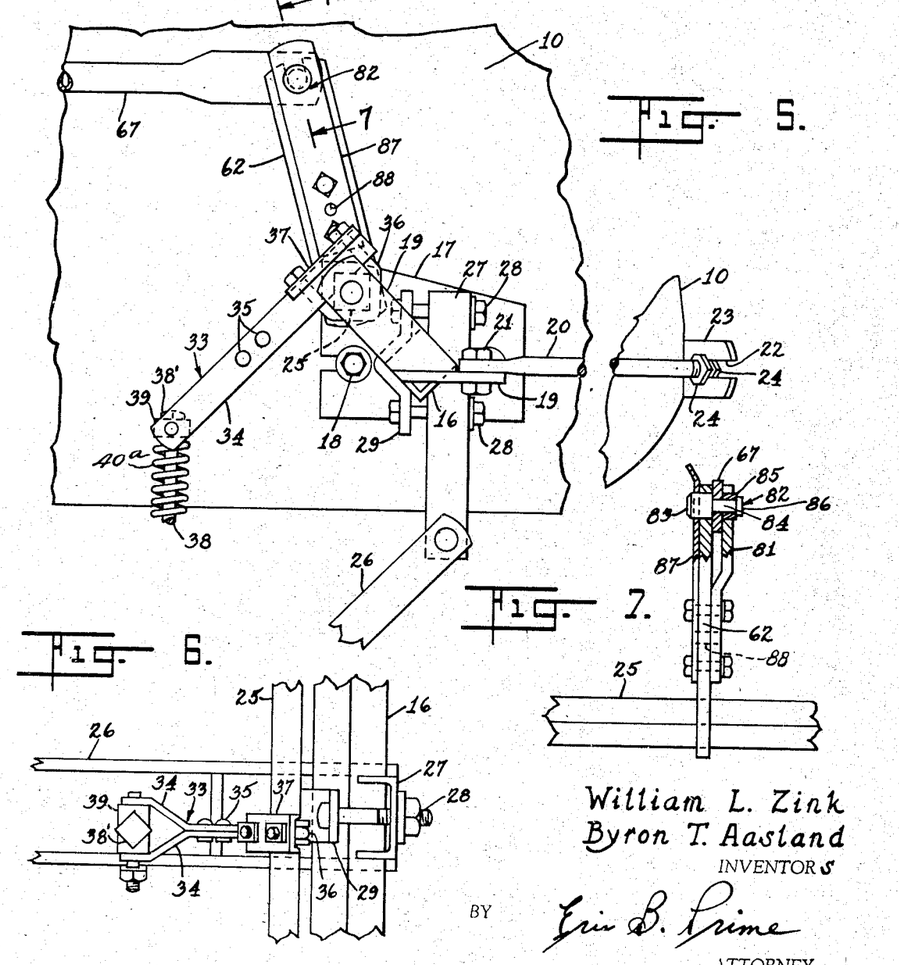
Figure 5 is an enlarged fragmentary side elevation of the structure connected to the front of the tractor.
Figure 6 is a fragmentary plan view of a portion of the structure shown in Figure 5.
Figure 7 is an end elevation of a part of the structure shown in Figure 5, a portion being shown in section as taken along the line 7—7 of Figure 5.

As best shown in Figures 1, 5 and 6, an actuating arm 33 is associated with each of the implement supporting beams 26 and has one end fixedly connected with the rocker shaft 25 and the other end operatively connected with the implement supporting beam 26. Each of the actuating arms 33 comprises a pair of bar members 34 which are secured at their mid-portions by means of rivets 35 and have the ends thereof spread for providing a space therebetween. The bar members 34 are provided with V-shaped openings for receiving a portion of the rocker shaft 25 and are fixedly connected and positioned with respect to the rocker shaft by means of a U-bolt 36 which extends around the rocker shaft 25 between the spaced ends of the bar members 34 and through openings in a channel shaped member 37 which is disposed on the bar members 34. The outer ends of the actuating arms 33 are operatively connected to the implement supporting beams by means of a threaded rod 38 having one end thereof slidably extending through a hub member 39, and the other end connected to a turn buckle 40, which, in turn, is pivotally secured to the implement supporting beam 26. A spring 40a is positioned on the threaded rod 38 and engages the hub 39 and nuts 40b adjustably positioned on the threaded rod 38 for yieldingly retaining the actuating arm 33 and the implement supporting beam in given relative positions. The topmost end of the threaded rod 38 is provided with a head 38' or other stop means which is adapted for engagement with the top side of the hub 39 so that the implement supporting beam 26 will be lifted when the actuating arm 33 is swung upwardly as a result of the rocker shaft 25 being rotated in a given direction.

From the preceding description, it will be seen that each of the supporting bars 16 is fixedly and detachably connected with the tractor frame, that the implement supporting beams 26 are pivotally carried by the supporting bars 16 and are movable for moving the tools carried thereby into and out of engagement with the ground, or for adjustably positioning the tools with respect to the ground when the rocker shaft 25 is actuated.

It will also be noted that by loosening the bolts 28 and the U-bolts 36, the spacing between the implement beams 26 may be varied so that the tools 30 carried thereby may be properly spaced to correspond to spacing of the rows of plants to be cultivated.

The structure by means of which the ground working tools or implements are carried at the rear of the tractor comprises a rear stationary supporting bar 41 similar to the front supporting bars 16, which is tubular and substantially square in cross-section, and a rear rocker shaft 42 which is also square in cross-section and similar to the front rocker shafts 25. The rear supporting bar 41 and the rear rocker shaft 42 are disposed in spaced apart parallel positions substantially horizontal to the ground, and are connected by means of end plates 43. The rear rocker shaft 42 is provided with end bearing portions 44 journalled in the end plates 43, and the ends of the rear supporting bar 41 are welded to the end plates 43 for supporting the rocker shaft 42. Intermediate plates 45 welded to the rear supporting bar 41 are also provided for supporting the rear rocker shaft and are adapted for rotatably receiving collars 46 which are mounted on the rear rocker shaft 42 and journalled in the intermediate plates 45.

Figures 8, 9, 10, 11, 12:
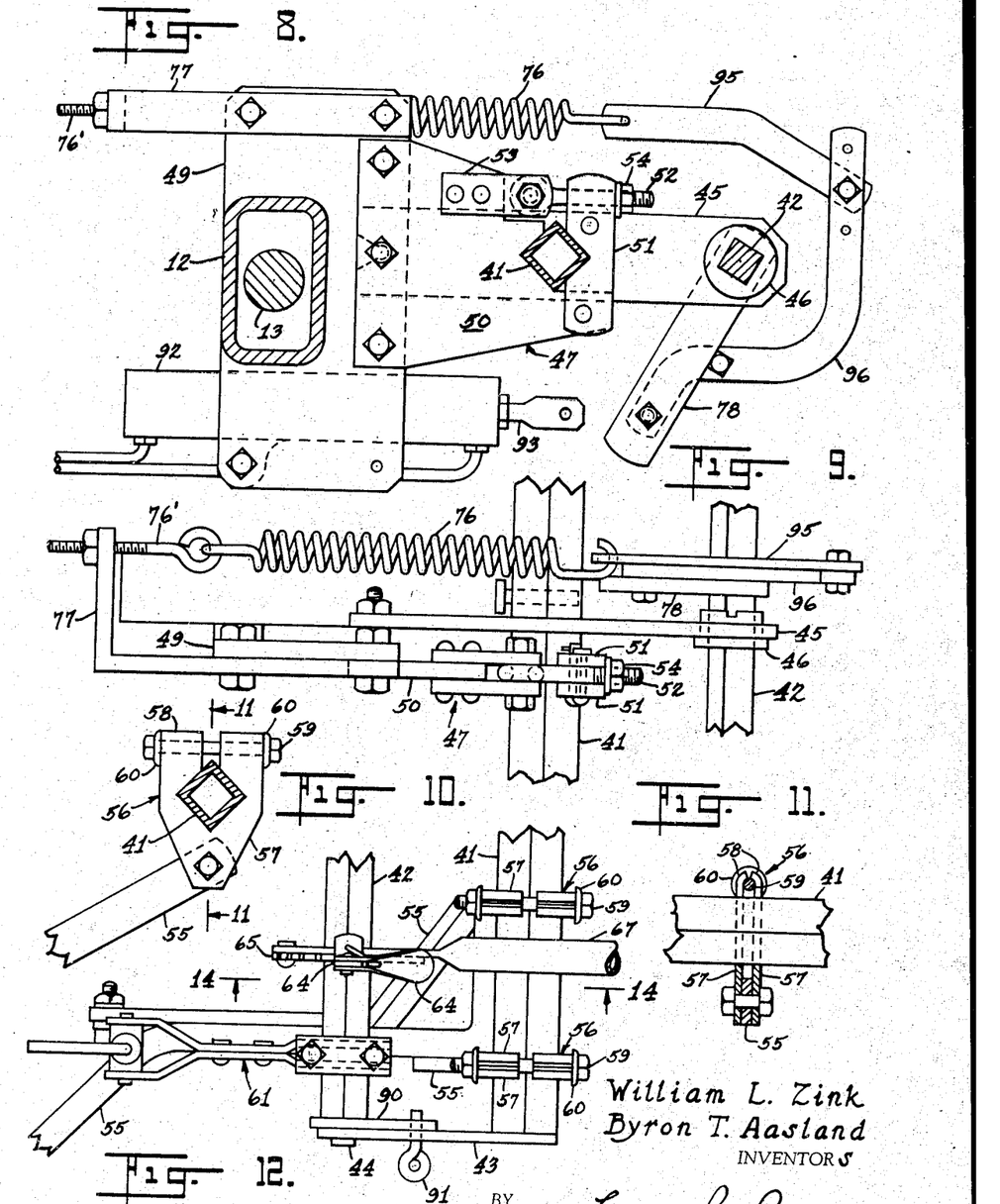
Figure 8 is an enlarged vertical sectional detail view taken along the line 8—8 of Figure 2.
Figure 9 is a top plan view of the structure shown in Figure 8.
Figure 10 is an enlarged vertical sectional detail view taken along the line 10—10 of Figure 2.
Figure 11 is a vertical sectional detail view taken along the line 11—11 of Figure 10.
Figure 12 is an enlarged fragmentary plan view of a portion of the structure connected to the rear of the tractor.
Figure 13:
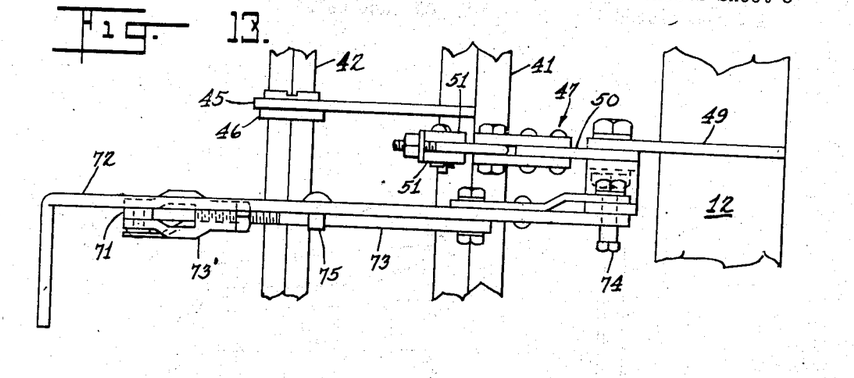
Figure 13 is an enlarged top plan view of a portion of the structure shown in Figure 2.

The rear supporting bar 41 is rigidly and detachably connected with the rear axle housing 12 by means of a pair of brackets 47 positioned oppositely with respect to the differential housing 48. As best shown in Figures 8 and 9, each of the brackets 47 comprises a plate member 49 welded to the rear axle housing and to which is bolted a bar supporting plate member 50. Each of the bar supporting plate members 50 is provided with a V-shaped recess for receiving the supporting bar 41, and a pair of clamping members 51 are pivotally connected to the plate member 50 on opposite sides thereof, and are provided with V-shaped recesses therein which are complementary to the V-shaped recess in the plate member 50 for receiving the rear supporting bar 41.

A locking bolt 52 is positioned between and pivotally connected to a pair of strap elements 53 which are positioned on opposite sides of and fixedly connected to the supporting plate 50. The locking bolt 52 is receivable between the spaced clamping members 51 and is provided with a locking nut 54 thereon cooperant with the members 51 for gripping the rear supporting bar 41 between the members 51 and the plate 50 and rigidly and detachably connecting the rear supporting bar 41 to the rear axle housing 12 of the tractor.

As shown in the drawings, a plurality of tool or implement supporting beams 55, similar to those hereinbefore described in connection with the front of the tractor, are positioned below the rear supporting bar 41 and are pivotally connected to bracket members 56 which in turn are connected to the rear supporting bar 41. As shown in Figures 10 and 11, each of the bracket members 56 comprises a pair of plates 57 provided with aligned openings therethrough for receiving the supporting bar 41 and spaced apart below the supporting bar for receiving therebetween the portion of the implement beam 55 pivotally connected therewith.

The portions of the plate members 57 extending above the supporting bar 41 are provided with arcuate formations 58 for receiving a bolt 59 therebetween which engages washer members 60 positioned at the ends of the plates for fixedly retaining the bracket plate members 57 in gripping engagement with the supporting bar 41. By loosening the bolts 59, the bracket members may be moved along the bar 41 for properly positioning the rear implement beams to the rows of plants to be cultivated. A plurality of actuating arms 61 are fixedly connected with the rear rocker shaft 42, and are operatively connected with the implement beams 55 pivotally carried by the supporting bar 41. The actuating arms 61 and the structure for connecting the arms to the rear rocker shaft 42 and for operatively connecting the arms 61 to the implement carrying beams 55 are similar to those structures hereinafter described in connection with the rocker shafts 25 and the implement carrying beams 26 associated with the front of the tractor, and, consequently, no further description of this structure is believed to be necessary.

Figure 14:
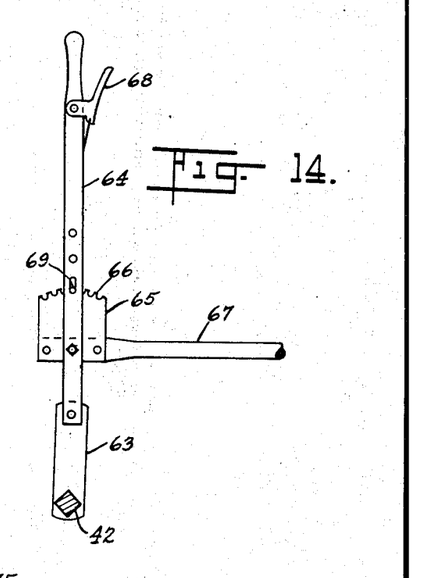
Figure 14 is a vertical sectional view taken substantially along the line 14—14 of Figure 12.

The structure for operatively connecting the rear rocker shaft 42 with the front rocker shaft 25 in order that both rocker shafts may be actuated at the same time for raising or lowering all of the implement beams 26 and 55 and the tools connected therewith, simultaneously, comprises an arm 62 fixedly connected to the front rocker shaft 25 and a similar arm 63 fixedly connected to the rear rocker shaft 42, as best shown in Figures 1, 5, and 14. A lever arm 64 is pivotally connected to the rear rocker shaft arm 63 and is also pivotally connected at an intermediate point thereof to a plate member 65 having the top edge thereof provided with teeth for forming a rack 66. A tubular rod 67 has one end pivotally connected to the front rocker arm 62 and the other end fixedly connected to the rack plate 65 for retaining the lever arm 64 and the plate 65 in fixed relative positions. A handle 68 is pivotally connected with the lever arm 64 and operatively connected with a catch means 69 adapted for engagement with the rack 66 for releasing the catch means from the teeth of the rack plate 65 whereby the relative positions of the lever arm 64 and the rack plate 65 may be changed.

Thus it will be seen that when the rear rocker shaft 42 is rotated a portion of a revolution, the front rocker shaft 25 will also be rotated a corresponding distance, and thereby provides for the simultaneous operation of the implement beams 26 and 55 connected with the rocker shafts 25 and 42. It will be noted, however, that when the catch means 69 is released from the teeth of the rack plate 65, the lever arm 64 may be actuated for adjustably positioning the front rocker shaft 25 and the implement beams 26 connected therewith with respect to and independently of the rear rocker shaft 42 and the independent beams 55 associated therewith. It will also be noted that each of the implement beams 26 and 55 may be adjustably positioned relatively to its respective actuating arms 33 or 61 by turning the threaded rod 38 in the bearing member 39 pivotally connected with the end of the actuating arm and in the turn buckle 40 pivotally connected with the implement beam.

Figure 15:
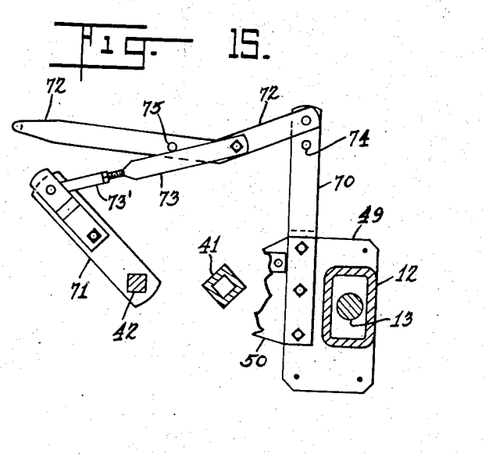
Figure 15 is a vertical sectional detail view taken substantially along the line 15—15 of Figure 2, showing the positions of the hand actuated lever for retaining the tools in engagement with the ground.

The mechanism for lifting or lowering the implement beams 26 and 55 and for retaining the implement beams in their lifted or lowered positions comprises an arm 70 connected to one of the axle housing brackets 49 by the bolts which secure the bracket plate 50 to the respective axle housing bracket. An arm 71 is also fixedly connected such as by welding to the rear rocker shaft 42. An actuating lever 72 has one end pivotally connected to the arm 70 and is operatively connected to the arm 71 by means of a link 73 which has one end pivotally connected to the lever arm 72 and the other end threaded for connecting to a turnbuckle 73' which in turn is pivotally connected to the arm 71. The lever supporting arm 70 and the lever 72 are provided with a pair of projecting lugs 74 and 75, respectively, which are positioned for engagement with the link 73 and are adapted for limiting the movement of the lever arm 72. As best shown in Figures 1, 8, and 9 a spring 76 is provided which has one end connected to an eye bolt 76' which in turn is adjustably secured to an arm 77 fixedly connected to the axle housing bracket 49, and the other end indirectly connected to an arm 78 which is fixedly secured or welded to the rear rocker shaft 42. When the implement beams 26 and 55 are in the lowered positions whereby the tools mounted thereon may work the ground, the actuating lever 72 is in the position shown in Figure 15, so that the lug 75 thereof engages the link 73. It will be noted that when the implement beams 26 and 55 are disposed in their lowermost positions, the lever 72 is positioned so that the pivotal axis of the link 73 with the lever arm 72 is disposed slightly below a straight line extending through the axes of the lever arm 72 with the fixed arm 70, and the link 73 with the arm 71, in which position the lever 72 is retained by the lug 75 on the lever arm 72 being in engagement with the link 73. The tension of the spring 76 associated with the rocker shaft 42 tends to retain the actuating lever 72 in the position above referred to, and, consequently, retains the implement beams and the implements carried thereby in their lowermost positions.

Figure 16:
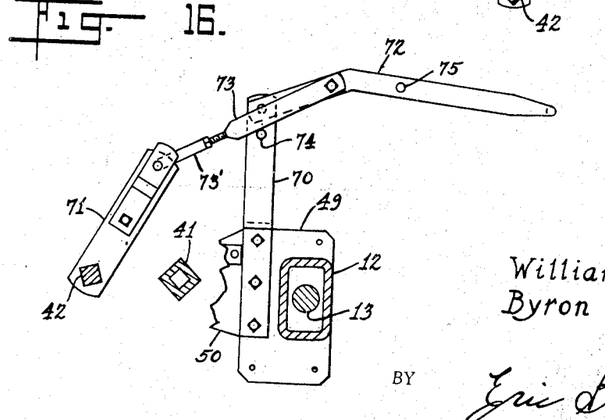
Figure 16 is a view similar to Figure 15 showing the position of the hand actuated lever for retaining the tools out of engagement with the ground.

When it is desired to lift the implement beams for moving the implements carried thereby out of engagement with the ground, the lever arm 72 is swung upwardly on its pivotal axis to the position shown in Figure 16, in which position the link 73 engages the projecting lug 74 connected to the stationary arm 70. As the actuating lever is swung upwardly for rotating the rocker shafts and lifting the implement beams, the force required for lifting the lever is decreased by the tension of the spring 76 so that a minimum amount of effort will be required on the part of the operator to move the implement beams and the implements carried thereby out of engagement with the ground.

It will be noted that the implement beams 26 and 55 are retained in their elevated positions by reason of the lever arm 72 being so positioned when the link 73 is in engagement with the lug 74 on the upright arm 70, that the pivotal axis of the lever arm 72 with the upright arm 70 will be disposed slightly above a straight line drawn through the pivotal axes of the link 73 with the lever 72 and the turnbuckle 73 with the arm 71 fixedly connected to the rear rocker shaft 42. It will, of course, be noted that when the rear rocker shaft 42 is actuated, the front rocker shafts 25 will also be actuated for lowering or lifting the implement beams associated therewith, that all of the implement beams may be raised or lowered and retained in their uppermost or lowermost positions by the lever arm 72 and that the lever arm 72 may be quickly and easily operated by the driver while sitting in the seat of the tractor.

Referring specifically to the details of the structure hereinbefore described, it will be noted that the bracket 23 connected to the front of the tractor, as best shown in Figure 5, and to which the rods 20 are attached, is provided with the slotted openings 22 in the end thereof in order that the rods 20 may be readily attached to or detached from the bracket 23.

Figure 4:
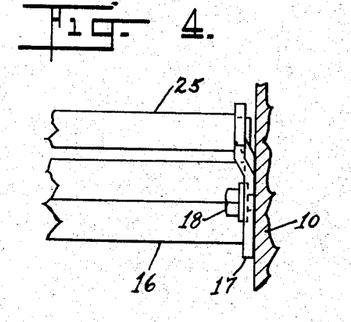
Figure 4 is an end elevation of the structure shown in Figure 3, a fragmentary portion of the tractor being shown in section.

As shown in Figures 3 and 4 of the drawings, each of the plates 17 associated with the front supporting bars 16 and the front rocker shafts 25 is connected to the tractor frame by means of the bolts 18 which are positioned on opposite sides of the respective supporting bars. The plate 17 is provided with a horizontal slotted opening 79 for receiving the rear bolt 18 positioned back of the supporting bar 16, and a vertical slotted opening 80 continuous with the lower edge of the plate 17 for receiving the front bolt 18 positioned in front of the supporting bar 16.

This arrangement of the slotted openings 79 and 80 in the plate 17 for receiving the fastening bolts 18 causes the load on the bolts to be so carried as to prevent any tendency of the bolts to become loose or to prevent any shifting of the plate 17 as a result of the heavy loads which may be transmitted thereto. It will be noted, however, that this arrangement of the slotted openings in the plate provides for the plate's being readily attached to or detached from the tractor frame.

As shown in Figures 5 and 7 of the drawings, each of the arms 62 fixedly secured to the front rocker shafts 25 and with which the tubular rods 67 are pivotally connected, comprises the primary arm 62 and an auxiliary arm 81 which is secured to the primary arm 62 by bolts and has a portion thereof spaced from the primary arm 62 for receiving the tubular rod 67 therebetween.

The primary arm 62 and the auxiliary arm 81 are provided with aligned slotted openings in the top thereof for receiving a pivot pin 82 fixedly connected to the end of the rod 67. The pivot pin 82 comprises an enlarged head portion 83, and a reduced shank 84 which extends through an opening in the rod 67 and on which a collar 85 is disposed in engagement with the opposite side of the rod 67. The collar 85 is retained on the reduced shank of the pivot pin by means of a headed end portion 86. The head 83 of the pivot pin 82 and the collar 85 associated therewith are preferably of the same diameter and are receivable in the aligned slotted openings in the primary arm 62 and the auxiliary arm 81.

The pivot pin 82 is retained in the slotted openings by means of a flat spring 87 which is secured to the primary arm 62 by the bolts which secure the auxiliary arm 81 to the primary arm, and is provided with an opening therein for receiving the head portion 83 of the pivot pin. The top of the spring member is bent outwardly so that when the head of the pivot pin and the collar 85 associated therewith are being moved into the aligned slotted openings, the spring member will be forced outwardly until the head 83 of the pin 82, and collar 85, are seated in the slots in the primary arm, and auxiliary arms, respectively, at which time the head 83 of the pin 82 is in registration with the opening in the spring arm, and the spring arm snaps back to the position shown in Figure 7.

When it is desired to disconnect the rod 67 from the arm 62, the spring 87 is merely forced outwardly so that the pivot pin 82 may be released from the spring. Each of the arms 62 is provided with an opening 88 (Fig. 5) for receiving a hook 89 (Fig. 2) fixedly connected to the front supporting bar 16 which serves to relieve the load on the lever arms 64 and 72 and the structure operatively connecting the rear rocker shaft 42 with the front rocker shaft 25 when the implement supporting beams 26 and 55 and the implements carried thereby are disposed in their suspended positions.

As shown in Figure 12 of the drawings, an arm 90 is fixedly connected to the rear rocker shaft 42 and is positioned adjacent one of the end plates 43 connected to the rear supporting bar 41. The arm 90 is provided with an opening therein adapted for registration with an opening in the end plate 43 when the implement supporting arms 55 are disposed in their raised positions whereby a retaining pin 91 may be inserted in the aligned openings. This construction supplements the action of the hooks 89 in connection with the arms 62 secured to the front rocker shafts 25 for relieving the load on the rear rocker shaft 42 resulting from the implement supporting arms 55 and 26 and the implements carried thereby being out of engagement with the ground.

If it is desirable to provide power means for actuating the front and rear rocker shafts whereby the implement supporting arms may be actuated for moving the implements into and out of engagement with the ground, the actuating lever 72 and the spring 76 together with the several parts for operatively connecting these members with the rocker shaft 42 may be removed, except the arm 78 fixedly connected with the rear rocker shaft 42, to which the spring 76 is connected.

In lieu of the mechanism for manually operating the rocker shafts, a power mechanism may be provided such as a hydraulic lift apparatus. As shown in Figure 8 a hydraulic lift apparatus which may be employed comprises a cylinder 92 having a plunger provided with a piston rod 93, the piston rod 93 being pivotally connected to the arm 78 connected to the rear rocker shaft 42, with which the spring 76 was formerly operatively associated. The hydraulic power lift apparatus is operable from the driver's seat of the tractor for extending and retracting the plunger rod 93, the plunger rod 93 when extended being adapted for lifting the implement beams 26 and 55 and retaining the implements carried thereby out of engagement with the ground, and when retracted, for lowering and retaining the implements in engagement with the ground.

Thus it will be seen that the mechanism by means of which the implements are positioned relatively to the ground, may be actuated and controlled by either manual or power means.

As best shown in Figures 8 and 9, when the spring 76 is used in combination with the lever arm 72 for actuating the rocker shafts, the angle arm 77 is fixedly connected to the bracket plates 49 secured to the axle housing, and an end of the spring 76 is adjustably connected to the angle arm 77 by means of the eye bolt 76' which extends through an opening in the angle arm 77 and is adapted for being adjustable connected with respect to the angle arm 77. The other end of the spring 76 is provided with an arm 95 pivotally connected to an intermediate arm 96, which, in turn, is attached to the arm 78 welded to the rear rocker shaft 42. When the hydraulic apparatus is used in lieu of the mechanism for manually operating the rocker shafts 25 and 42, the angle arm 77, together with the arms 95 and 96 may be detached from the bracket plate 49 secured to the axle housing and from the arm 78 fixedly connected to the rear rocker shaft 42.

In summarizing the more important of the advantages of the structure above described it will be readily seen that a tractor-cultivator combination is provided which is very flexible in that the implement structure may be quickly and easily attached to, or detached from the tractor; that the implement beams may be readily disposed in the proper spaced positions to correspond to the spacing of the rows of plants; that the implement beams on either side of the front of the tractor and at the rear of the tractor may be readily adjusted as to depth of cultivation independently of the other implement beams; that each implement beam may also be independently adjusted as to depth of cultivation; that all of the implement beams may be lifted and lowered either by manual means or by power operated means; and that the implement structure is simple in construction and quickly and easily operated.

Modifications and changes may be made in the structure above described without departing from the spirit of the invention and it is intended that the invention be limited only by the scope of the appended claims.

We claim:

1. In an agricultural implement, the combination with a tractor of attachment means connected with the tractor comprising cultivator rigs positioned at the front and rear of the tractor and swingable toward and away from the ground, a front rock shaft operatively connected with the front cultivator rigs and a rear rock shaft operatively connected with the rear cultivator rigs for lifting or lowering the cultivator rigs when the rock shafts are rotated, an arm fixedly connected to the front rock shaft and an arm fixedly connected to the rear rock shaft, a rack member, a link having one end pivotally connected to the front rock shaft arm and the other end fixedly connected to the rack member, and a latch lever pivotally connected to the rear rock shaft arm and to the link and adapted for locking engagement in different positions with the rack member for adjustably positioning the front cultivator rigs independently of and relatively to the rear cultivator rigs.

2. In an agricultural implement, the combination with a tractor of attachment means connected with the tractor comprising a frame beam disposed at a side of the tractor and extending outwardly therefrom in a substantially horizontal position, plate members connected to the inner and outer ends of the frame beam, the inner plate member being adapted for being fixedly and detachably connected to the tractor for supporting the frame beam, a reinforcing member connected with the outer plate member and fixedly and detachably connected to the tractor, a rock shaft rotatably carried by the plate members, cultivator rigs hingedly connected to the frame beam and swingable toward and away from the ground, actuating arms fixedly connected to the rock shaft and operatively connected to the cultivator rigs for lifting or lowering the cultivator rigs relatively to the ground when the rock shaft is actuated, and means for actuating said rock shaft.

3. In an agricultural implement, the combination with a tractor of attachment means connected with the tractor comprising a frame beam disposed at a side of the tractor and extending outwardly therefrom in a substantially horizontal position, a bracket member fixedly connected to the inner end of the frame beam for attachment to the tractor, said bracket member having a horizontal slotted opening continuous with the rear edge thereof and a vertical slotted opening continuous with the lower edge thereof, anchor bolts connected to the tractor and receivable in the slotted openings for detachably connecting the frame beam to the tractor, means for connecting the outer end of the frame beam with the tractor, a cultivator rig hingedly connected to the frame beam and swingable toward and away from the ground, and means carried by the frame beam and operatively connected to the cultivator rig for lifting and lowering the cultivator rig.

4. In an agricultural implement, the combination with a tractor of attachment means connected with the tractor comprising a frame beam disposed at a side of the tractor and extending outwardly therefrom in a substantially horizontal position, a bracket member fixedly connected to the inner end of the frame beam for attachment to the tractor, said bracket member having a horizontal slotted opening continuous with the rear edge thereof and a vertical slotted opening continuous with the lower edge thereof, anchor bolts connected to the tractor and receivable in the slotted openings for detachably connecting the frame beam to the tractor, said slotted openings and their respective anchor bolts being positioned on opposite sides of the frame beam, the centers of the bolts and the frame beam being substantially in a common plane, means for connecting the outer end of the frame beam with the tractor, a cultivator rig hingedly connected to the frame beam and swingable toward and away from the ground, and means carried by the frame beam and operatively connected to the cultivator rig for lifting and lowering the cultivator rig.

5. In an agricultural implement, the combination with a tractor of attachment means connected with the tractor comprising a frame beam disposed at a side of the tractor and extending outwardly therefrom in a substantially horizontal position, a bracket member fixedly connected to the inner end of the frame beam for attachment to the tractor, said bracket member having a horizontal slotted opening continuous with the rear edge thereof and a vertical slotted opening continuous with the lower edge thereof, anchor bolts connected to the tractor and receivable in the slotted openings for detachably connecting the frame beam to the tractor, an auxiliary bracket fixedly connected with the tractor and provided with a slotted opening therein continuous with an end thereof, a brace member fixedly connected to the outer end of the frame beam and receivable in the slotted opening in the auxiliary bracket for being fixedly and detachably connected therewith, a cultivator rig hingedly connected to the frame beam and swingable toward and away from the ground, and means carried by the frame beam and operatively connected to the cultivator rig for lifting and lowering the cultivator rig.

6. In an agricultural implement, the combination with a tractor, of attachment means connected with the tractor, comprising cultivator rigs movable toward and away from the ground, actuating members operatively connected severally with said rigs for lifting and lowering said rigs when the actuating members are actuated, arms fixedly connected to the actuating members, a rack member, a link pivotally connected to one of the arms and fixedly connected to the rack member, and a latch lever pivotally connected to the other arm and to the link and adapted for locking engagement in different positions with the rack member for adjustably positioning one of the rigs independently of and relatively to the other rig.

7. In an agricultural implement, the combination with a tractor, of attachment means connected with the tractor, comprising cultivator rigs movable toward and away from the ground, a rock shaft operatively connected with each rig for lifting and lowering the rigs when the rock shafts are rotated, arms fixedly connected to the rock shafts, a rack member, a link pivotally connected to one of the arms and fixedly connected to the rack member, and a latch lever pivotally connected to the other arm and to the link and adapted for locking engagement in different positions with the rack member for adjustably positioning each rig independently of and relatively to the other rig.

8. In an agricultural implement, the combination with a tractor, of attachment means connected with the tractor, comprising a frame beam disposed at a side of the tractor and extending outwardly therefrom, means for connecting the ends of the beam to the tractor, a rock shaft rotatably carried by the ends of said beam, a cultivator rig hingedly connected to the frame beam and swingable toward and away from the ground, actuating means fixedly connected to the rock shaft and operatively connected to the rig for lifting and lowering the rig in response to corresponding actuation of the rock shaft, and means for actuating said rock shaft.

9. In an agricultural implement, the combination with a tractor of attachment means connected with the tractor comprising a frame member horizontally and transversely positioned at the rear of the tractor, clamping means fixedly carried by the tractor and including relatively movable jaws clampingly engaging opposite sides of said member for clamping said member in said position, shaft supporting members fixedly connected to the ends of the frame member and extending rearwardly with respect to the tractor, a rock shaft rotatably mounted on the shaft supporting members and positioned substantially parallel to the frame member, cultivating rigs hingedly connected to the frame member and swingable toward and away from the ground, actuating arms fixedly connected to the rock shaft and operatively connected to the cultivator rigs for lifting or lowering the cultivator rigs relatively to the ground when the rock shaft is actuated, an arm fixedly connected to the rock shaft, and means operatively connected to said arm for actuating said rock shaft and lifting or lowering the cultivator rigs.

WILLIAM L. ZINK.
BYRON T. AASLAND.